United States Patent [19]

Torng

[11] Patent Number: 4,944,248

[45] Date of Patent: Jul. 31, 1990

[54] POLYGEN FISH GLOBE

[76] Inventor: Chen Ching Torng, 10F No. 50 Sung Chiang Rd., Taipei, Taiwan

[21] Appl. No.: 221,985

[22] Filed: Jul. 20, 1988

[51] Int. Cl.$^5$ ............................................. A01K 63/00
[52] U.S. Cl. ...................................................... 119/5
[58] Field of Search .................................. 119/1, 2-5

[56] References Cited

U.S. PATENT DOCUMENTS

| | | | |
|---|---|---|---|
| 1,435,457 | 11/1922 | Fearnow | 119/5 |
| 2,636,473 | 4/1953 | Schwartz et al. | 119/5 |
| 2,730,496 | 1/1956 | Zarod | 119/5 |
| 2,871,820 | 2/1959 | Hayden | 119/5 |
| 3,024,764 | 3/1962 | Brittain et al. | 119/3 |
| 3,028,837 | 4/1962 | Tuttle | 119/2 |
| 3,149,608 | 9/1964 | Murphy | 119/2 |
| 3,759,223 | 9/1973 | D'Andrea | 119/5 |
| 3,785,342 | 1/1974 | Rogers | 119/5 |

Primary Examiner—Robert Peshock
Assistant Examiner—R. Thomas Price
Attorney, Agent, or Firm—Lowe, Price, LeBlanc, Becker & Shur

[57] ABSTRACT

An aquarium or fish tank as disclosed. The tank includes a mesh shelf spaced above the bottom and a port through a side of the tank below the shelf. A tube extends through the port with a downwardly opening nozzle at the end thereof. A valve is disposed at an opposite end and a drain hole. The drain hole is adapted to be attached to a source of vacuum so that debris on the bottom of the tank will be sucked through the nozzle and exit the tube at the drain hole. A valve is disposed at the drain hole to control opening and closing thereof. A resilient seal is provided where the tube extends through the port so that the nozzle end of the tube can be moved both laterally across the bottom and longitudinally toward and away from the port.

3 Claims, 2 Drawing Sheets

POLYGEN FISH GLOBE

FIELD OF THE INVENTION

This invention refers to a fish tank which is able to be cleaned without taking out the fish, or to take out the pebbles in the bottom. Removal of fish excrement requires only to set a plastic pipe in a water outlet in the tank and open a valve therein to remove the dirt in the tank.

DESCRIPTION OF THE PRIOR ART

Many people wish to have a fish tank or aquarium in their home for enjoyment, but the disadvantage is the dirt accumulated in the tank which causes the water to be unclean and can result in the death of fish. Cleaning the tank can be time consuming and troublesome. This prevents many people from enjoying a fish tank or aquarium.

SUMMARY OF THE INVENTION

This invention refers to an aquarium including a fish tank (glass box), netting shelves, waterproof oil seal, water sealing valve, dirt absorbing tube, water outlet, sucker and supporting post.

The object of this invention is to provide a fish tank which can be cleaned without taking the fish and the pebbles out. When the dirty water is drawn out of the tank, the excrement of the fish and other waste matter are drawn out and drained off simultaneously. This kind of fish globe doesn't require a filter to save energy and avoids the problem resulting from the structure and circuit of the filter. A detailed description along with drawings of the structure and function of this invention is given as follows:

BRIEF DESCRIPTION OF THE DRAWINGS

FIG. 1a is a vertical sectional perspective view of an alternate embodiment of the fish tank of this invention;

FIG. 2a is a longitudinal sectional view of the dirt suction device of FIG. 1a;

DETAILED DESCRIPTION

Figure 1:
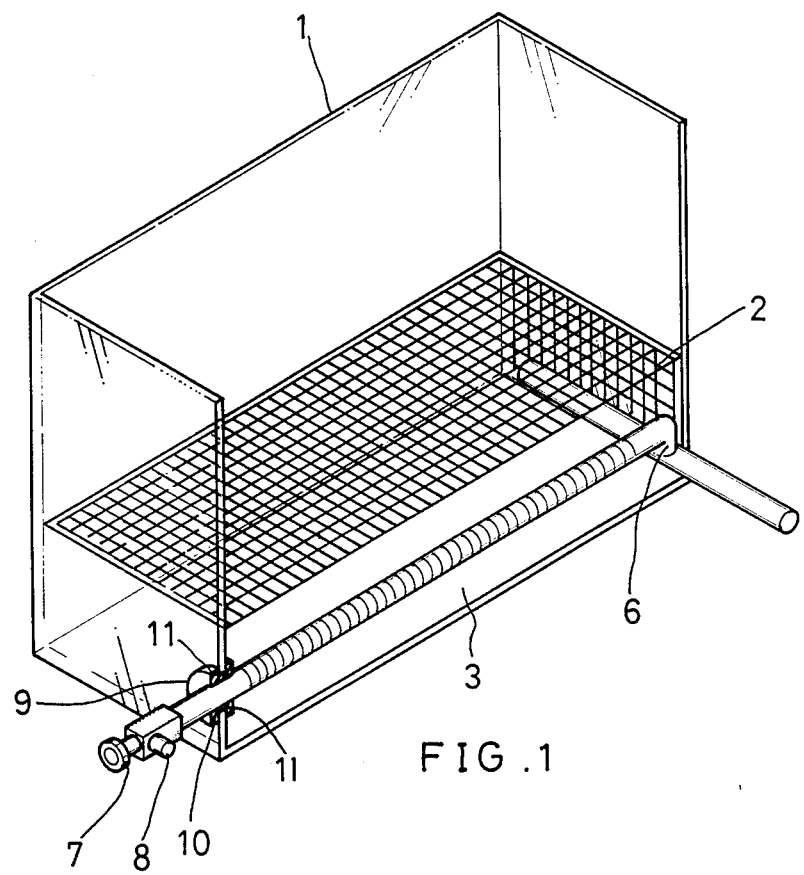
FIG. 1 is a vertical sectional perspective view of the fish tank of this invention.
Figure 5:
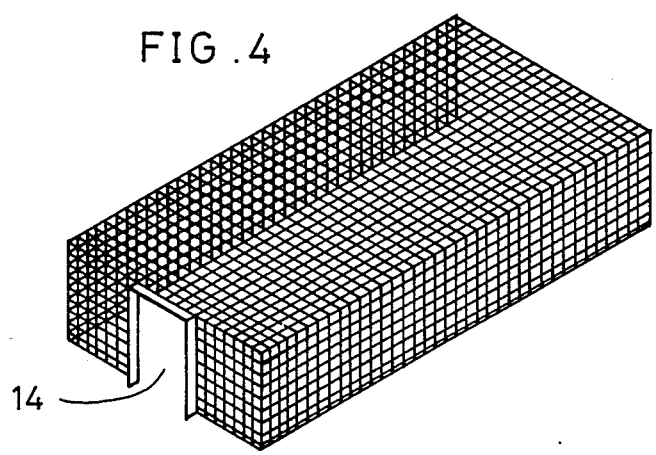

As shown in the Figures, the fish tank of this invention includes the tank itself 1, and several netting shelves 2 stretched on the lower part of the body 1. There is a small distance (allowing for a layer of pebbles) between the netting shelves which are laid in rows in the tank, and a layer of pebbles may also be laid on the top of the upper layer netting shelf. The appearance of the Polygen fish tank in this case is the same as the conventional ones, i.e., the netting shelves 2 are covered with pebbles. There also are spaces 3 to be used as sedimentary chambers below each layer of netting shelf 2 to accumulate superfluous food and excrement from the fish. There is a round hole in a lateral glass wall 13 of the fish tank 1 for the convenience of installing waterproof seal 9 which has a flange 11 on the left and right sides to form a trough therebetween in order to wedge seal 9 against the glass tightly. There is a round hole 12 in the center of the waterproof seal (FIG. 3) for the insertion of the dirt suction device into the sedimentary chamber 3 in the tank 1. Excepting to prevent the water in the globe from flowing out, the function of the waterproof seal provides also a convenience in the cleaning of the tank. There may be a hole 14 on the netting shelf aligned with the round hole 12 as shown in FIG. 5, and the sucker 5 of the dirt suction device (FIG. 2) moves left and right or it is pulled and pushed repeatedly; because the waterproof seal is made with soft rubber, the dirt suction device does not cause leakage while it moves left and right or as it is pulled and pushed. There is a water sealing valve 7 on the dirt suction device (FIG. 2) for opening or closing the dirt outlet 8. A draining pipe is set on the outlet 8 to cause the sucking force in the water pipe while being removed from the outlet after the cleaning of the fish tank. The supporting post 6 of the sucker 5 is used to prevent the sucker 5 from touching the surface of the bottom of the fish tank and to maintain a distance between the sucker and the bottom of the fish tank so that the sucking force remains most powerful. There are gradations on the tubular part of the dirt suction device in the fish tank (FIG. 1). The distance between adjacent marks is equal to the diameter of the sucker 5, i.e., while the dirt suction device moves from left to right, the dirt suction device is pulled out one scale; while it moves again from right to left, then it is pulled out one more scale. The operation proceeds repeatedly until the completion of cleaning While the four corners of the fish tank cannot be reached with the dirt suction device, they may be washed away by pouring in clean water and then cleaning the whole tank once again as above. So the fish tank will be cleaned completely.

Figure 2:
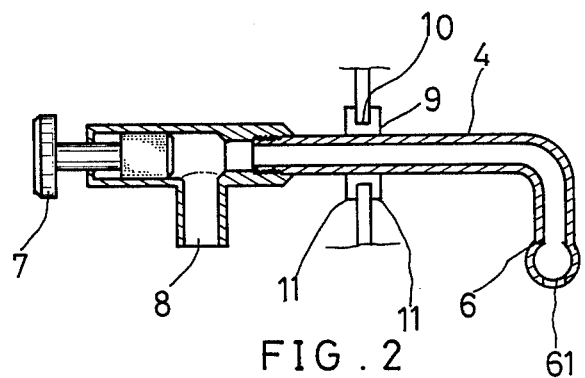
FIG. 2 is a longitudinal sectional view of the dirt suction device of this invention.
Figure 3:
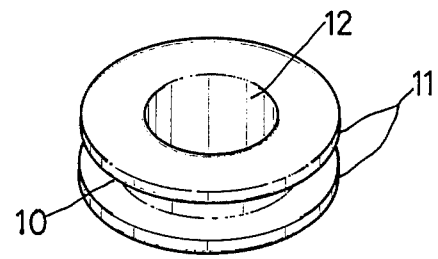
FIG. 3 is a perspective view of the waterproof seal.
Figure 4:
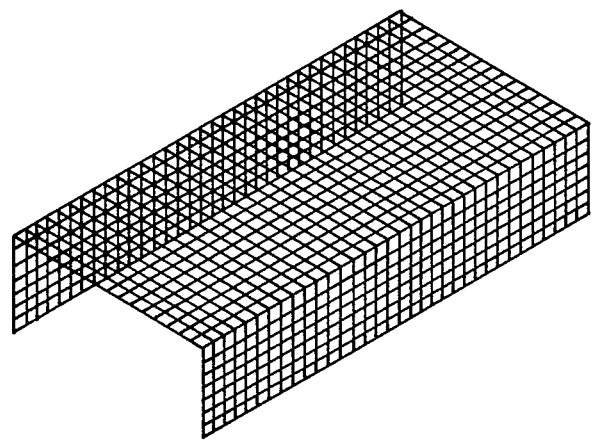
FIG. 4 and 5 are perspective views of the netting shelf of this invention.

FIG. 1a and 2a shown an alternative embodiment of the device of this invention. Like reference numbers from FIGS. 1 and 2 identify the same parts. The only difference between the embodiment of FIGS. 1 and 2 and FIGS. 1a and 2a is in the replacement of sucker 5 with a T-shaped suction member 61 which extends laterally across the tank. This device as shown in FIG. 2a has an opening in the bottom portion thereof which extends the length of member 61. In this embodiment then it is unnecessary to move member 6 laterally left and right as it is withdrawn to clean the bottom of the tank 1. The device is simply withdrawn slowly and as it moves from the position shown in FIG. 1a to a position adjacent the seal 9, the cage will be cleaned.

I claim:

1. An aquarium comprising:

a tank having a bottom and upstanding walls one of the walls defining a port disposed adjacent the bottom;

a mesh shelf disposed within said tank and spaced above the bottom and above the port, said shelf adapted to support a layer of small stones;

an elongated suction tube extending through the port and of sufficient length to extend across the bottom of said tank, said tube terminating at the end inside the tank in a downwardly opening nozzle, and the end of said tube opposite said nozzle having a drain opening adapted to be coupled to a source of reduced pressure so that debris on the bottom will be sucked through the nozzle and expelled through the drain;

valve means coupled to said tube for opening and closing the drain opening therein; and resilient seal means for sealing engagement between the exterior of said tube and said port for permitting sliding and lateral movement of said tube without leakage.

2. The aquarium of claim 1 further comprising spacer means carried by said nozzle for spacing the opening therein immediately above the bottom of the tank.

3. The aquarium of claim 1 further comprising gradation means extending substantially the length of said tube for marking lengths equal to the width of the opening of the nozzle in a direction along the longitudinal axis of said tube.

* * * * *